UNITED STATES PATENT OFFICE.

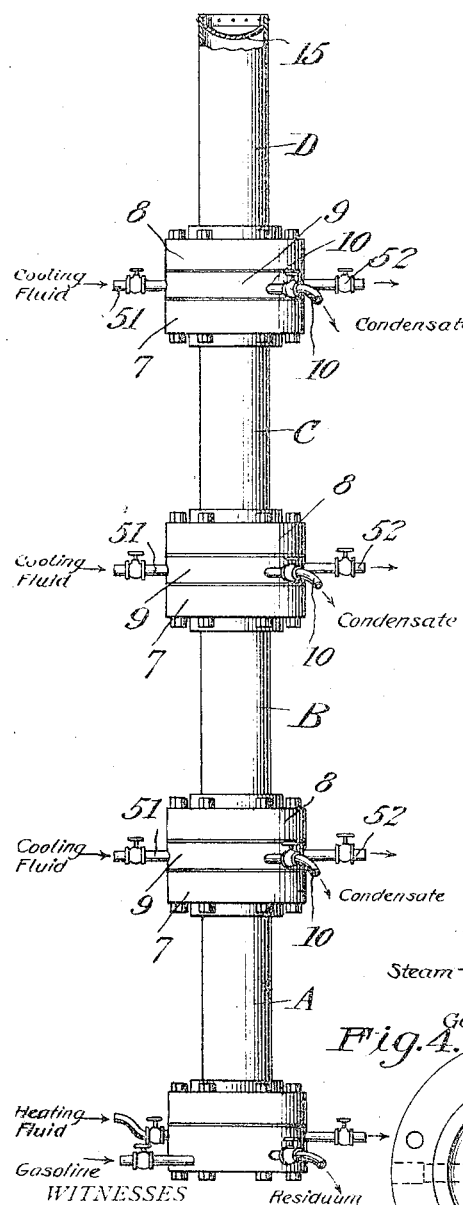

WALTER O. SNELLING, OF PITTSBURGH, PENNSYLVANIA, ASSIGNOR, BY MESNE ASSIGNMENTS, TO CONSOLIDATED LIQUID GAS COMPANY, OF CHICAGO, ILLINOIS, A CORPORATION OF ARIZONA.

REFINING APPARATUS.

1,259,679. Specification of Letters Patent. Patented Mar. 19, 1918.

Application filed February 21, 1913, Serial No. 749,873. Renewed January 26, 1918. Serial No. 214,034.

*To all whom it may concern:*

Be it known that I, WALTER O. SNELLING, a citizen of the United States, residing at Pittsburgh, in the county of Allegheny and State of Pennsylvania, have invented certain new and useful Improvements in Refining Apparatus, of which the following is a specification.

My invention relates to an apparatus for refining a mixture of condensable vapors or gases, such as the mixture of vapors or gases resulting from the vaporization of what is known as "natural gas gasolene" though my apparatus may obviously be used for the separation of other substances. This gasolene contains, in addition to the hydrocarbons, such as butane, pentane, hexane and heptane found in ordinary gasolene, lighter hydrocarbons of the paraffin series, such as ethane and propane, and it is the object of my invention to provide an apparatus for separating from the mixture of vapors or gases, these lighter hydrocarbons, to simultaneously obtain fractions of higher boiling point and of more or less definite composition, and to obtain the most volatile ingredient or mixture directly in the form of a liquefied gas under pressure. If a liquid containing several volatilizable ingredients be vaporized in a closed vessel, the boiling points, or the limits of temperature at which each ingredient will remain liquid, gradually rise as the pressure increases, but the rates at which the boiling points rise as the pressure increases, are not uniform, the boiling points of the more volatile ingredients rising less rapidly than the boiling points of the less volatile ingredients. Thus, at high pressure, by which I mean, even for liquids of low boiling point, a minimum pressure of two or three atmospheres, the boiling points of the ingredients are more widely separated than at low pressures, such as those approximating one atmosphere.

In my apparatus, a liquid containing several volatile ingredients is heated to a temperature sufficient to completely volatilize all of the volatile ingredients, the vapors or gases being kept under maintained pressure, the pressure being so high that the boiling points of the several ingredients will be widely separated, and then each ingredient, or each fraction containing several ingredients, is separately condensed, at a temperature slightly below the boiling point, at the high pressure to which the mixture is subjected, of that particular ingredient or fraction.

A preferred form of my new apparatus is illustrated in the accompanying drawings, though it is to be understood that other forms may be used within range of the invention.

Figure 1 is an elevation of the still;

Fig. 2 is a section of one of the condensing sections;

Fig. 3 is a section of the vaporizing portion of the still;

Fig. 4 is a plan view of a distance piece; and

Fig. 5 is a plan of the bottom piece of the vaporizer.

The refining apparatus consists of a vaporizer A, and condensing sections B, C, D. The vaporizer A is heated by a steam coil 1. The gasolene is admitted through pipe 2, and is discharged through the perforated spray ring 3 over coil 1. 4 is a wooden filling piece. The unvaporized residues of higher boiling point hydrocarbons, or unvolatilized ingredients are removed through pipe 6.

As will be apparent from Figs. 4 and 5, the base piece 50 is provided with a passage 60 for gasolene, to which passage pipe 2 is connected; with passages 63, 64 to which the steam supply and discharge pipes 61 and 62 are connected; and with a passage 65, connected to pipe 6 for discharging residual material.

The condensing sections B, C, D, are alike in construction except that the upper section has an inwardly concaved head 15 of boiler plate.

Each of the condensing sections consists of a body portion of steel pipe, having screwed thereon a top ring 7 and bottom ring 8, each of cast iron and provided with the necessary bolt holes. 92, 92 are lead gaskets. 9 are separating pieces of cast iron, forming the top of a lower section and the bottom of an upper section, each having passages 54, 55 therethrough to which are connected pipes 51, 52 for supplying and discharging cooling fluid; a central passage 53, to which is connected a pipe 13; and a passage 56 for delivering the condensate to the pipe 10.

Tight joints are secured by providing rings 11 to fit into corresponding groves 12, with interposed lead gaskets, the various sections being bolted together by bolts 90 so that a gas tight tower, capable of standing a high internal pressure, such as 900 lbs. to the square inch, is produced.

The vapors are delivered from one section to the next through pipes 13, against wooden filler blocks, 91, and are thus compelled to pass over the cooling coils. Each of the various pipes referred to may be provided with such cocks or valves as are necessary.

In carrying out the process, the liquid, such as natural gas gasolene, is sprayed over the coil 1, which is heated by some means such as superheated steam to a temperature sufficient to produce by the vaporization of the gasolene a high pressure, say 900 lbs., throughout the apparatus, as the condensing sections are in communication with each other and the outlets are provided with suitable stop cocks of any well known form, pressure produced is maintained throughout the apparatus. The pressure in the apparatus may be controlled by varying the supply of fresh gasolene and the temperatures of the vaporizer and condensing chambers.

The vapors produced in the vaporizer A pass up through pipe 13, into condenser section B, and over the coil 16 therein, through which hot water is passing, and that portion of the mixture condensable at the pressure in the chamber and at the temperature of the coil, is condensed and passes out through pipe 10, to which is, of course, connected a suitable delivery pipe.

The coil in the chamber C carries warm water and that in chamber D, cold water.

Fractions containing the hydrocarbons of higher boiling point will be condensed and collected from sections B and C; that from section C may be gasolene of about 108° B, and that from section B, gasolene of about 80° B. I do not wish to be understood as limiting the process to these particular qualities of product, as it is evident that by varying the temperatures of the cooling coils products of any desired degree may be obtained.

As the condensation is effected under high pressure, the temperatures of the cooling coils may be much higher than those used at atmospheric pressure, thus avoiding the inconvenience and expense due to the use of such low temperature refrigerants as liquid ammonia,—cold water being sufficient to effect the condensation of the ethane and propane in the upper section of the still, from which there is directly obtained under high pressure a liquefied gas, which may be collected in suitable receptacles.

The various liquids delivered from the various pipes are collected into suitable receptacles, which it is unnecessary to illustrate as the conditions required to properly handle the materials will be obvious to those skilled in the art.

If the gas or vapor to be condensed is already under high pressure and at a sufficiently high temperature, the vaporizer A may be omitted, and the gas or vapor introduced directly into the lower condensing section. I do not herein claim the process of separation which is covered by U. S. Patent No. 1,056,845, granted to me March 25, 1913.

I claim:

1. A condenser section, comprising a tube having flanges at its top and bottom, a separating piece extending across the bottom of said tube, a cooling coil extending into said tube and having its ends secured to said separating piece, said separating piece having passages therein leading from the ends of the coil to the outside, a central passage therethrough opening into the tube, and a passage for removing condensate.

2. A condenser section, comprising a tube having flanges at its top and bottom, a separating piece extending across the bottom of said tube, a cooling coil extending into said tube and having its ends secured to said separating piece, said separating piece having passages therein leading from the ends of the coil to the outside, a central passage therethrough opening into the tube, a passage for removing condensate, an upwardly extending vapor pipe connected to said central passage, and a filling block within the coil and above said vapor pipe.

3. A condenser section, comprising a tube having flanges at its top and bottom, a separating piece extending across the bottom of said tube, a cooling coil extending into said tube and having its ends secured to said separating piece, said separating piece having passages therein leading from the ends of the coil to the outside, a central passage therethrough opening into the tube, and a passage for removing condensate, said distance piece and flanges having coöperating sealing rings and grooves.

4. A refining apparatus, consisting of a tower-like structure having at its base a vaporizer comprising a tube having top and bottom flanges, a heating coil and supply-tube mounted in a base piece having passages therein connected to the heating coil and supply-tube and a passage for residuum, and means for securing the base-piece and bottom flange together; and a series of condenser sections each comprising a tube having flanges provided with means for connecting it to adjacent sections, a separating piece extending across the bottom of said tube, and a cooling coil extending into said tube and having its ends secured to said separating piece, said separating piece having passages therein leading from the ends of the coil to the outside, a central passage therethrough opening into the tube, and a passage for removing condensate.

In testimony whereof I affix my signature in presence of two witnesses.

WALTER O. SNELLING.

Witnesses:
C. R. KERR.
GEORGE SCHULER.